United States Patent [19]

Darms et al.

[11] 4,111,771

[45] Sep. 5, 1978

[54] CROSSLINKABLE TETRA-IMIDYL DERIVATIVES AND CROSSLINKED POLYMERS THEREFROM

[75] Inventors: Roland Darms, Therwil; Vratislav Kvita, Muttenz; Gerd Greber, Binningen, all of Switzerland

[73] Assignee: Ciba-Geigy Corporation, Ardsley, N.Y.

[21] Appl. No.: 747,757

[22] Filed: Dec. 6, 1976

[30] Foreign Application Priority Data

Dec. 19, 1975 [CH] Switzerland ............... 16513/75

[51] Int. Cl.$^2$ ........................................... C08G 73/12
[52] U.S. Cl. ..................... 204/159.22; 204/159.14; 204/159.19; 204/159.23; 428/474; 528/86; 528/99; 528/228; 528/310
[58] Field of Search ........ 260/47 UA, 47 CP, 78 UA, 260/78 TF, 65, 78 SC, 49; 204/159.22, 159.23, 159.14, 159.19

[56] References Cited

U.S. PATENT DOCUMENTS

| | | | |
|---|---|---|---|
| 3,625,912 | 12/1971 | Vincent et al. | 260/30.2 |
| 3,639,357 | 2/1972 | Cohen | 260/78 UA |
| 3,666,720 | 5/1972 | Nieid et al. | 260/47 UA |
| 3,671,490 | 6/1972 | Bargain | 260/47 CP |
| 3,689,464 | 9/1972 | Holub et al. | 260/78 UA |

*Primary Examiner*—Lester L. Lee
*Attorney, Agent, or Firm*—Luther A. R. Hall

[57] ABSTRACT

New crosslinkable tetra-imidyl derivatives are described which are obtained by reaction of 3,5-bis-imidylphthalic acid derivatives, e.g. 3,5-bis-maleimidylphthalic acid anhydride, with monomeric, oligomeric or polymeric diamines. The new crosslinkable tetra-imidyl derivatives are suitable for the production of various shaped articles, such as coating compositions and mouldings, and are distinguished by their good crosslinking properties.

12 Claims, No Drawings

CROSSLINKABLE TETRA-IMIDYL DERIVATIVES AND CROSSLINKED POLYMERS THEREFROM

The present invention relates to new crosslinkable tetra-imidyl derivatives, to a process for producing them, as well as to their use for the production of crosslinked polymers.

The invention relates to tetra-imidyl derivatives which correspond to the formula I

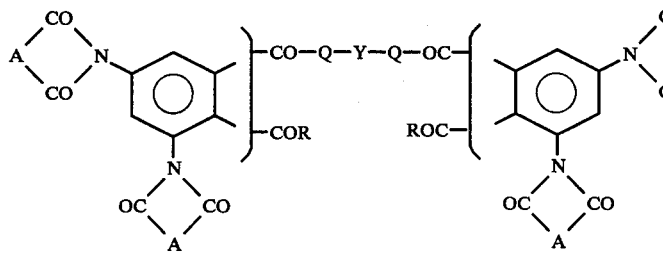
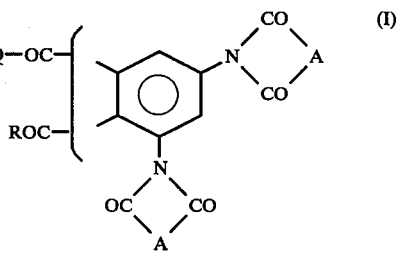

wherein
the R s independently of one another represent a hydroxyl group, an unsubstituted or substituted phenoxy group, an alkoxy group having 1–18 carbon atoms or an $-O^-M^+$ group.
the A s independently of one another represent a radical of the formula

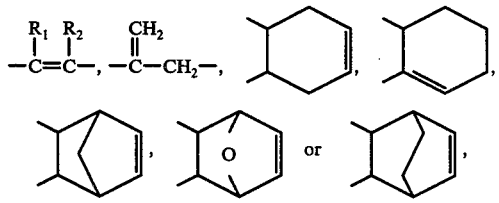

$R_1$ and $R_2$ independently of one another represent hydrogen, chlorine, bromine or methyl,
$M^+$— represents an alkali metal cation, a trialkylammonium cation having 3–24, particularly 3–12, carbon atoms or a quaternary ammonium cation,
Q— represents —NH— and Y a bivalent organic radical having at least two carbon atoms,
or —Q—Y—Q— represents the grouping

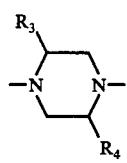

wherein $R_3$ and $R_4$ independently of one another represent hydrogen, methyl or phenyl,
as well as to the corresponding cyclised derivatives.

The A s in the formula I represent preferably identical radicals as defined, especially a radical of the formula

and particularly a radical of the formula —CH═CH—.

Organic radicals represented by Y or —Q—Y—Q— can be monomeric, oligomeric or polymeric.

Suitable monomeric organic radicals Y (Q = —NH—) are, in particular, aliphatic radicals having at least two carbon atoms, cycloaliphatic, carbocyclic-aromatic or heterocyclic-aromatic radicals.

In the case of oligomeric or polymeric organic radicals, Y preferably represents a structural element of the formula II

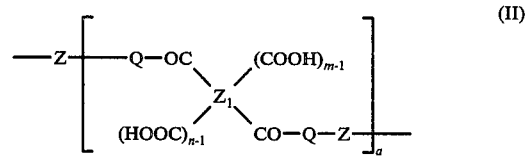

or a corresponding cyclised derivative, wherein
a — represents a number from 1–100, preferably a number from 1–60, and especially a number from 1–10, and the individual symbols $m$, $n$, Q, Z and $Z_1$ independently of one another represent the following:
$m$ and $n$ represent the number 1 or 2,
Q— represents —NH— and
Z— represents an aliphatic radical having at least two carbon atoms, a cycloaliphatic, carbocyclic-aromatic or heterocyclic-aromatic radical, or
Q and Z together with the adjacent Q in the formula I represent the grouping

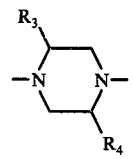

wherein $R_3$ and $R_4$ independently of one another represent hydrogen, methyl or phenyl,
$Z_1$ represents an aliphatic radical having at least 2 carbon atoms, or a cycloaliphatic, carbocyclic-aromatic or heterocyclic-aromatic radical, in which the carbonamide groups and carboxyl groups are bound to different carbon atoms, and the carboxyl groups, if $Z_1$ represents a cyclic radical and at least one of $m$ and $n$ represents the number 2, are each in the ortho-position with respect to a carbonamide group.

The tetra-imidyl derivatives of the formula I according to the invention and the corresponding cyclised derivatives can be obtained by a process wherein a compound of the formula III

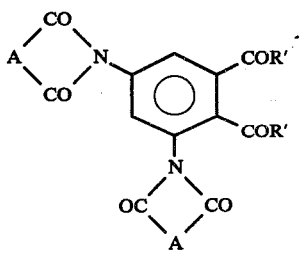
(III), or a mixture of two different compounds of the formula III wherein A has the meaning given under the formula I, and the R' s independently of one another represent a hydroxyl group, an unsubstituted or substituted phenoxy group, an alkoxy group having 1–18 carbon atoms, or the two R' s together represent the —O— grouping, is reacted, in a molar ratio of at least 2:1, with a compound of the formula IV $$HQ-Y-QH \qquad (IV),$$

wherein in respect of Q and Y or —Q—Y—Q— that applies which has been stated under the formula I; and the resulting compound of the formula I is optionally subsequently cyclised and/or converted into another derivative as defined, i.e. into a compound of the formula I wherein the R s have another meaning as defined.

The conversion into other compounds, as defined, of the formula I can be performed in a manner known per se, e.g. by reaction of the free acids (R = OH) with alcohols or with salt-forming bases to give compounds of the formula I, wherein the R s represent alkoxy, phenoxy or —O⁻M⁺ groups as defined, or by transesterification.

If R s or R's represent substituted phenoxy groups, such groups are, in particular, phenoxy groups substituted by nitro groups, alkyl or alkoxy groups having 1 or 2 carbon atoms or by halogen atoms, especially by chlorine or fluorine, such as the 2-, 3- or 4-nitrophenoxy group, the 2,4- or 3,5-dinitrophenoxy group, the 3,5-dichlorophenoxy group, the pentachlorophenoxy group or the 2-methylphenoxy or 2-methoxyphenoxy group.

Alkoxy groups R and R' can be straight-chain or branched-chain. The following may be mentioned as examples: the methoxy, ethoxy, n-propoxy, isopropoxy, n-butoxy, tert-butoxy, hexyloxy, octoxy, decyloxy, dodecyloxy, tetradecyloxy and octadecyloxy group. Unsubstituted phenoxy groups and alkoxy groups having 1–12, especially 1–4, carbon atoms are preferred.

If R represents an —O⁻M⁺ represents, for example, the lithium, sodium, potassium, trimethylammonium, triethylammonium, methyl-diethylammonium and tri-n-octylammonium cation. Examples of quaternary ammonium cations M⁺ are the benzyl-trimethylammonium and tetramethylammonium cation. M⁺ preferably represents the sodium cation.

The two R s and R' s preferably each represent identical groups as defined. Particularly preferably, the R s each represent a hydroxyl group, whilst the two R' s together preferably form the —O— grouping.

Groups or radicals as defined which are represented by Y or Z can be unsubstituted or substituted, e.g. by halogen atoms such as fluorine, chlorine or bromine, or by alkyl or alkoxy groups each having 1–4 carbon atoms.

The individual m, n, Q, Z and $Z_1$ in formula II can have different meanings.

Suitable aliphatic radicals Y or Z are, in particular, straight-chain or branched-chain alkylene groups having 2–12 carbon atoms, especially unsubstituted alkylene groups having 2–10 carbon atoms. The alkylene chain can also be interrupted by hetero atoms, such as by O, S or N atoms.

Y and Z as a cycloaliphatic radical represent, e.g., the 1,3-, or 1,4-cyclohexylene group, the 1,4-bis-(methylene)-cyclohexane group or the dicyclohexylmethane group.

If Y or Z represent carbocyclic-aromatic radicals, these are preferably monocyclic, condensed polycyclic or uncondensed bicyclic aromatic radicals, and in the case of the last-mentioned the aromatic nuclei can be bound together by way of a bridge member.

Examples of suitable bridge members which may be mentioned are:

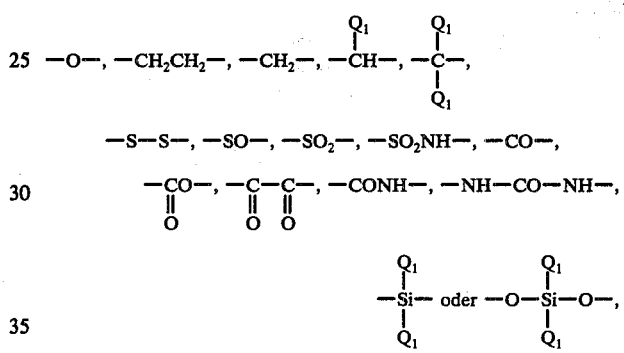

wherein $Q_1$ — represents an alkyl group having 1–6, preferably 1–4, carbon atoms, or a phenyl group.

Uncondensed bicyclic aromatic radicals Y or Z can also be bound together by way of two bridge members, such as two —SO₂— groups.

If Y or Z represent a heterocyclic-aromatic radical, such radicals are, in particular, heterocyclic-aromatic, 5- or 6-membered rings containing O, N and/or S.

If $Z_1$ represents an aliphatic radical, these radicals are preferably unsubstituted, straight-chain or branched-chain saturated alkylene groups having 1–12 carbon atoms, especially unsubstituted alkylene groups having 2–10 carbon atoms.

Cycloaliphatic radicals represented by $Z_1$ are, in particular, 5- or 6-membered cycloalkylene groups.

If $Z_1$ represents a carbocyclic-aromatic radical, this preferably contains at least one 6-membered ring; such radicals are, in particular, monocyclic or condensed polycyclic radicals or polycyclic radicals having several cyclic, condensed or uncondensed systems which can be bound together direct or by way of bridge members. Suitable bridge members are the groups mentioned in the foregoing in the discussion of Y and Z.

If $Z_1$ represents a heterocyclic-aromatic radical, such radicals are, in particular, 5- or 6-membered heterocyclic-aromatic, optionally benzo-condensed ring systems containing O, N and/or S.

Carbocyclic-aromatic or heterocyclic-aromatic radicals represented by $Z_1$ can also be substituted, for example by nitro groups, alkyl groups having 1–4 carbon atoms, halogen atoms, especially chlorine, silyl groups, sulphonic acid groups or sulphamoyl groups.

Preferably, Y and the individual Z s where Q = = —NH— independently of one another represent an unsubstituted alkylene group having 2-12 carbon atoms, or a monocyclic or uncondensed bicyclic aromatic radical which is unsubstituted or substituted by halogen atoms, alkyl or alkoxy groups each having 1-4 carbon atoms, and in the latter case the aromatic nuclei are bound together direct or by way of the bridge member —O—, —CH$_2$— or —SO$_2$—.

The individual Z$_1$ s preferably represent, independently of one another, an unsubstituted alkylene group having 2-10 carbon atoms, or an unsubstituted monocyclic aromatic radical, a condensed polycyclic aromatic radical or an uncondensed bicyclic aromatic radical and, in the case of the last-mentioned, the aromatic nuclei are bound together by way of the bridge-member —O— or —CO—.

Quite generally, preferred compounds of the formula I are those wherein R represents a hydroxyl group, and the corresponding cyclised derivatives.

Monomeric tetra-imides of the formula I which are very particularly preferred are those wherein Q represents —NH—, Y represents the 1,3- or 1,4-phenylene group, the 4,4'-diphenylmethane group, 4,4'-diphenylsulphone group or 4,4'-diphenyl ether group, A represents the radical —CH=CH— and R represents a hydroxyl group, as well as the corresponding cyclised derivatives.

Preferred oligomeric or polymeric compounds are those with structural elements or the formula II wherein Q represents —NH—, Z represents an unsubstituted alkylene group having 2-10 carbon atoms, or a carbocyclic-aromatic radical, particularly the 1,3- or 1,4-phenylene group, the 4,4'-diphenyl ether group, the 4,4'-diphenylsulphone group or the 4,4'-diphenylmethane group, and Z$_1$ represents an unsubstituted alkylene group having 2-10 carbon atoms, or a carbocyclic-aromatic radical, especially the 1,3- or 1,4-phenylene group, a benzenetriyl or benzenetetrayl group or the benzophenone ring system, as well as the corresponding cyclised derivatives.

More especially preferred are compounds of the formula I with structural elements of the formula II wherein A and R have the preferred meanings mentioned in the foregoing, Q represents —NH—, and a represents an integer from 1-10 and wherein
- —m and n represent the number 1, Z represents the 1,3- or 1,4-phenylene group, the 4,4'-diphenylmethane group or 4,4'-diphenyl ether group, and Z$_1$ represents the 1,3- or 1,4-phenylene group, and of Z and Z$_1$ only one represents the 1,4-phenylene group;
- —m and n represent the number 2, Z represents the 4,4'-diphenylmethane group or 4,4'-diphenyl ether group, and Z$_1$ represents a benzenetetrayl group or the benzophenone ring system;
- — per structural element, m represents the number 1 and n represents the number 2, Z represents the 4,4'-diphenylmethane group or 4,4'-diphenyl ether group, and Z$_1$ represents a benzenetriyl group, as well as the corresponding cyclised derivatives.

The starting compounds of the formula III can be obtained by a process wherein a diamine of the formula V

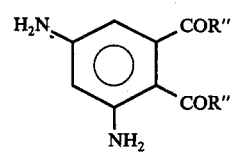

is reacted with an anhydride of the formula VI

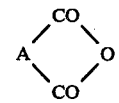

and the resulting amidocarboxylic acid of the formula VII

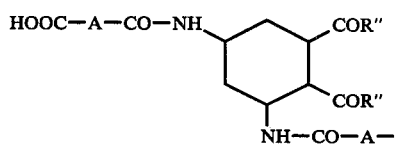

is subsequently cyclised and optionally converted into another derivative as defined of the formula III.

In the above formulae V to VII, A has the meaning given under formula I, and R" represents a hydroxyl group, an unsubstituted or substituted phenoxy group free from electro-negative substituents, an alkoxy group having 1-18 carbon atoms, or an —O$^{31}$M$^{30}$ group. Compounds of the formula III wherein the R' s represent phenoxy groups having electronegative substituents, such as nitro groups or halogen atoms, are advantageously produced by reaction of corresponding anhydrides with suitable alcohols, or by transesterification of compounds of the formula III with R' being alkoxy or phenoxy which is free from electronegative substituents.

The reaction of the diamines of the formula V with the anhydride of the formula VI can be performed in the melt, or in an aqueous, aqueous-organic or organic medium.

For cyclisation of the amidocarboxylic acids of the formula VII, it is possible to use customary catalysts, such as sodium acetate or triethylamine, and/or dehydrating agents, e.g. acetic acid anhydride. Simultaneously with the formation of the imide there occurs under certain circumstances, i.e. depending on the nature of the substituent R", also the formation of the anhydride, e.g. if R" = OH.

The conversion of the resulting compounds into other derivatives as defined of the formula III is performed in a conventional manner, e.g. by the methods mentioned in the foregoing.

The compounds of the formula IV usable in the process according to the invention are known or can be produced in a manner known per se.

The following may be mentioned as examples of monomeric diamines of the formula IV: o—, m— and p-phenylendiamine, diaminotoluenes such as 2,4-diaminotoluene, 1,4-diamino-2-methoxybenzene, 2,5-diaminoxylene, 1,3-diamino-4-chlorobenzene, 4,4'-diamino-diphenylmethane, 4,4'-diaminodiphenyl ether, 4,4'-diaminodiphenyl thioether, 4,4'-diaminodiphenylsulphone, 2,2'-diaminobenzophenone, 4,4'-diaminodiphenylurea, 1,8- or 1,5-diaminonaphthalene, 2,6- diaminopyridine, 2,4-diaminopyrimidine, 1,4-piperazine, 2,4-diamino-s-triazine, di-, tri-, tetra-, hexa-, hepta-, octa-, deca- and dodecamethylenediamine, 2,2-dimethylpropylenediamine, 2,5-dimethylhexamethylenediamine, 4,4-dimethylheptamethylenediamine, 3-methyl-heptamethylenediamine, 3-methoxyhexamethylenediamine, 2,11-diaminododecane, 2,2,4-and 2,4,4-trimethylhexamethylenediamine, 1,2-bis-(3-aminopropoxy)-ethane, N,N'-dimethylethylenediamine, N,N'-dimethyl-1,6-diaminohexane, as well as the diamines of the formulae $H_2N(CH_2)_3O(CH_2)_3NH_2$ and $H_2N(CH_2)_3S(CH_2)_3NH_2$ and 1,4-diaminocyclohexane.

It is also possible to use mixtures of different monomeric diamines of the formula IV.

Compounds of the formula IV wherein Q represents —NH— and Y represents a structural element of the formula II can be obtained, in a manner known per se, by condensation of di-, tri- or tetracarboxylic acid derivatives of the formula VIII

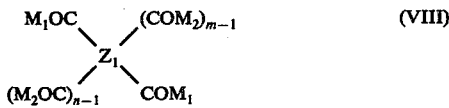

(VIII)

wherein $m$, $n$ and $Z_1$ have the meanings given under formula II and $M_1$ represents a chlorine atome, a hydroxyl group, an unsubstituted or substituted phenxoy group or an alkoxy group having 1-18 carbon atoms; or $M_1$; if at least one of m and n represents the number 2, together with an $M_2$ forms the —O— grouping, with the groups —$COM_1$ and —$COM_2$ being bound to different carbon atoms, and the —$COM_1$ group or groups, if $Z_1$ represents a cyclic radical and at least one of m and n represents the number 2, being in the ortho-position with respect to a —$COM_2$ group,
with an excess of a diamine of the formula IX

(IX), wherein in respect of Q and Z or —Q—Z—Q— that applies which is stated under formula II; and possible subsequent cyclisation.

It is also possible to use mixtures of different compounds of the formula VIII and diamines of the formula IX.

If $M_1$ represents an unsubstituted or substituted phenoxy group or an alkoxy group having 1-18 carbon atoms, preferably 1-12 carbon atoms, such groups are, for example, those mentioned in the foregoing in the discussion of R and R'.

The compounds of the formulae VIII and IX are known per se. As diamines HQ—Z—QH it is possible to use, for example, compounds of the aforementioned type. Examples of suitable di-, tri- and tetracarboxylic acid derivatives of the formula VIII are: malonic acid, dimethylmalonic acid, succinic acid, glutaric acid, adipic acid, suberic acid, sebacic acid and dodecanedicarboxylic acid, 1,3-cyclopentanedicarboxylic acid, hexahydroisophthalic acid, hexahydroterephthalic acid, terephthalic acid, isophthalic acid, 4,4'-dicarboxydiphenylethane, naphthalene-2,6-dicarboxylic acid, thiophene-2,5-dicarboxylic acid and pyridine-2,3-dicarboxylic acid, as well as the corresponding dichlorides and diesters as defined; trimellitic acid-1,2-anhydride-chloride, (1,3-dioxo-benzo[c]oxalane-5-carboxylic acid chloride), trimellitic acid anhydride as well as esters as defined; pyromellitic acid dianhydride, 3,3', 4,4'-benzophenone-tetracarboxylic acid dianhydride, 2,3,3',4'-benzophenone-tetracarboxylic acid dianhydride, 2,2'3,3'-benzophenone-tetracarboxylic acid dianhydride, 3,3',4,4'-diphenyl-tetracarboxylic acid dianhydride, bis(2,3-dicarboxyphenyl)-methane-dianhydride, bis(2,5,6-trifluoro-3,4-dicarboxyphenyl)-methane-dianhydride 2,2-bis (2,3-dicarboxyphenyl)propane-dianhydride, bis(3,4-dicarboxyphenyl) ether dianhydride, bis-(3,4-dicarboxyphenyl)-sulphone-dianhydride, N,N-(3,4-dicarboxyphenyl)-N-methyl-amine-dianhydride, bis-(3,4-dicarboxyphenyl)-diethylsilane-dianhydride.

2,3,6,7- and 1,2,5,6-naphthalene-tetracarboxylic acid-dianhydride, 2,6-dichloronaphthalene-1,4,5,8-tetracarboxylic acid-dianhydride, thiophene-2,3,4,5-tetracarboxylic acid-dianhydride, pyrazine-2,3,5,6-tetracarboxylic acid-dianhydride, pyridine-2,3,5,6-tetracarboxylic acid-dianhydride.

The dicarboxylic acid derivatives used are preferably dicarboxylic acid dichlorides.

The condensation of the compounds of the formula III and VIII with the compounds of the formula IV or with the diamines HQ—Z—QH is performed in a manner known per se, advantageously at temperatures of about −50° to +300° C. The condensation can be performed in the melt or preferably in an inert organic solvent or in a solvent mixture. For the condensation in solution, temperatures of −20° to +50° C are preferred. For the reaction of the compounds of the formula III with the compounds of the formula IV, the addition of known polymerisation inhibitors, such as hydroquinones, brenzcatechin, cresoles, e.g. di-tert-.butylcresole, can under certain circumstances be advantageous.

As organic solvent it is possible to use, e.g.:
optionally chlorinated aromatic hydrocarbons, such as benzene, toluene, xylenes and chlorobenzene;
chlorinated aliphatic hydrocarbons, such as methylene chloride, chloroform, tetrachloroethane and tetrachloroethylene;
aliphatic and cycloaliphatic ketones, such as acetone, methyl ethyl ketone, cyclopentanone and cyclohexanone;
cyclic ethers, such as tetrahydrofuran, tetrahydropyrane and dioxane;
cyclic amides, such as N-methyl-2-pyrrolidone, N-acetyl-2-pyrrolidone and N-methyl-ε-caprolactam;
N,N-dialkylamides of aliphatic monocarboxylic acids having 1-3 carbon atoms in the acid moiety, such as N,N-dimethylformamide, N,N-dimethylacetamide, N,N-diethylacetamide and N,N-dimethylmethoxyacetamide;
ethylene glycol monoalkyl ethers and ethylene glycol dialkyl ethers each having 1-4 carbon atoms in the alkyl moieties, such as ethylene glycol monomethyl ether, ethylene glycol monethyl ether, ethylene glycol monisopropyl ether and ethylene glycol mono-n-.butyl ether, ethylene glycol dimethyl ether and ethylene glycol diethyl ether;
alkyl esters of aliphatic monocarboxylic acids having a total of 2-6 carbon atoms, such as formic acid or acetic acid methyl ester, formic or acetic acid ethyl ester and formic acid or acetic acid n-butyl ester.
hexamethylphosphoric acid triamide (hexametapol);
N,N,N',N'-tetramethylurea;
tetrahydrothiophene dioxide (sulpholane);
dialkyl sulphoxides, such as dimethyl and diethyl sulphoxide. It is also possible to use mixtures of such solvents.

Preferred solvents are N,N-dialkylamides of aliphatic monocarboxylic acids having 1-3 carbon atoms in the acid moeity, especially N,N-dimethylacetamide, as well as cyclic amides, such as N-methyl-pyrrolidone.

The hydrochloric acid forming on condensation or polycondensation of compounds of the formula VIII, wherein $M_1$ represents chlorine, with the diamines HQ—Z—QH can be removed by neutralisation with basic substances such as calcium hydroxide or triethylamine, or by reaction with an epoxide compound such as ethylene oxide or propylene oxide, and by washing out with suitable solvents, e.g. water.

The condensation reactions are advantageously performed with the exclusion of moisture, e.g. in an inert gas atmosphere, such as nitrogen.

The compounds of the formula III are reacted with the compounds of the formula IV in a molar ratio of at least 2:1. If the compounds of the formula IV is a monomeric diamine, this diamine is advantageously used in a stoichiometric amount or in an amount slightly less than the equivalent amount. For the reaction with oligomers or polymers of the formula IV which contain terminal amino groups, the reactants are used preferably in a stoichiometric amount.

In the case of the eventual cyclisation of the compounds of the formula I or IV resulting on condensation, there occurs imide formation. Cyclisation is performed, in a manner known per se, chemically or preferably thermally.

Chemical cyclisation is advantageously performed by treatment with a dehydrating agent alone or in admixture with a tertiary amine. Suitable for the purpose are, e.g.: acetic acid anhydride, propionic acid anhydride and dicyclohexylcarbodiimide, or mixtures of acetic acid anhydride and triethylamine.

Thermal cyclisation is performed by heating at temperatures of about 50°-250° C., preferably about 100°-150° C, optionally with the addition of an inert organic solvent and/or of a water-entrainer such as xylenes or toluene. At temperatures above about 150° C there generally also occurs at least partial crosslinking.

The compounds of the formula I according to the invention and the corresponding cyclised derivatives can be crosslinked, by methods known per se, chemically, thermally or under the influence of electromagnetic waves, especially light, to give polymers.

Crosslinking can also be performed in the presence of diamines and/or vinyl compounds, e.g. diamines of the aforementioned formula IX, and/or vinyl compounds of the formula X

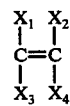   (X)

wherein
$X_1$ and $X_3$ each represent hydrogen, $X_2$ represents hydrogen, chlorine or methyl, and $X_4$ represents hydrogen, methyl, ethyl, chlorine, —CN, —COOH, —CONH$_2$, phenyl, methylphenyl, methoxyphenyl, cyclohexyl, pyridyl, imidazolyl, pyrrolidonyl, -COO-alkyl having 1-12 carbon atoms in the alkyl moiety, —COO-phenyl,

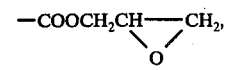

—COO-alkyl—OH having 1-3 carbon atoms in the alkyl moiety, —OCO-alkyl having 1-4 carbon atoms in the alkyl moiety, —OCO-phenyl, -CO-alkyl having 1-3 carbon atoms in the alkyl moiety, alkoxy having 1-6 carbon atoms, phenoxy, —CH=CH$_2$ or

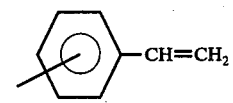

or
$X_1$ and $X_2$ each represent hydrogen, and $X_3$ and $X_4$ together form the grouping

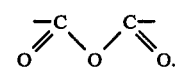

The following may be mentioned as examples of such vinyl compounds: ethylene, propylene, 1-butene, isoprene, 1,4-butadiene, vinyl chloride, vinylidene chloride, acrylic acid, methacrylic acid, acrylonitrile, methacrylonitrile, chloroacrylonitrile, styrene, ring-substituted methyl styrenes, 4-methoxy styrene, vinylcyclohexane, acrylic acid methyl ester, methacrylic acid methyl ester, acrylic acid ethyl ester and methacrylic acid ethyl ester, acrylic acid isopropyl ester and methacrylic acid isopropyl ester, acrylic acid-2-ethylhexyl ester and methacrylic acid-2-ethylhexyl ester and acrylic acid phenyl ester and methacrylic acid phenyl ester, acetic acid vinyl ester and propionic acid vinyl ester, acrylic acid-2,3-epoxypropyl ester and methacrylic acid-2,3-epoxypropyl ester, benzoic acid vinyl ester, 2-vinylpyridine, 4-vinylpyridine, vinylimidazole, vinylpyrrolidone, methyl vinyl ketone, ethyl vinyl ketone, ethyl vinyl ether, n-butylvinyl ether and divinyl benzene.

Preferred are vinyl compounds of the formula X wherein $X_1$ and $X_3$ each represent hydrogen, $X_2$ represents hydrogen or methyl, and $X_4$ represents —COO-alkyl having 1-10 carbon atoms in the alkyl moiety, or $X_1$, $X_2$ and $X_3$ each represent hydrogen and $X_4$ represents —CN, chlorine, phenyl or -OCOCH$_3$.

As diamines there are preferably used those of the formula IX wherein the Q s each represent —NH—, and Z represents an unsubstituted alkylene group having 2-10 carbon atoms or a carbocyclic-aromatic radical, especially the 1,3- or 1,4-phenylene group, the 4,4'-diphenyl ether group, 4,4'-diphenylsulphone group or 4,4'-diphenylmethane group.

Chemical crosslinking is in general performed at temperatures of about 50° to 250° C and in the presence of known radical initiators, such as inorganic and organic peroxides or azo compounds, e.g. hydrogen peroxide, tert. butylhydroxy peroxide, peracetic acid, benzoyl peroxide, tert. butylperbenzoate, cumolhydroperoxide, dicumyl peroxide and α,α'-azo-isobutyronitrile.

Thermal crosslinking is performed advantageously by heating at temperatures up to about 350° C, preferably 150°-250° C, optionally in the presence of radical initiators of the above-mentioned type.

For crosslinking under the influence of electromagnetic waves, suitable compounds of the formula I are in particular those wherein the A s represent a radical of the formula

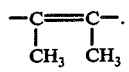

Crosslinking can be performed, e.g., by irradiation with X rays or with UV light, and optionally in the presence of sensitisers, such as benzene, 1,4-diacetylbenzene, phenol, benzonitrile, acetophenone, benzophenone, benzaldehyde, di-isopropyl ketone and fluorene.

The tetra-imidyl derivatives of the formula I according to the invention and the corresponding cyclised derivatives are suitable for the production of industrial products, such as coating compositions, lacquers, foam plastics, adhesives, laminating resins, composite materials, moulding powders, moulded articles and so forth, in a manner known per se and optionally with the use of customary additives, such as pigments, fillers, etc. They can in general also be processed from the melt.

Compared with known-bis-imides, particularly bis-maleimides, the tetra-imidyl derivatives according to the invention are distinguished by their good crosslinking properties. The products obtained on crosslinking have good mechanical, electrical and/or thermal properties and, compared with known polymers of a comparable type, they are characterised by an increased thermooxidative stability.

EXAMPLE 1

The 3,5-bis-maleimidyl-phthalic acid anhydride used as starting product can be produced by reaction of 3,5-diaminophthalic acid with maleic acid anhydride, and cyclisation of the resulting 3,5-bis-maleamidyl-phthalic acid with a mixture of sodium acetate and acetic acid anhydride.

EXAMPLE 2

A specimen of the tetra-imide produced according to Example 1 is moulded in a platen press at 240° C for 40 minutes under a pressure of 180 kp/cm². On annealing at 220° C for 16 hours there is obtained a transparent solid disc.

EXAMPLE 3

In a nitrogen atmosphere in a sulphonating flask, 3.96 g (0.02 mole) of 4,4'-diaminodiphenylmethane is dissolved in 120 ml of anhydrous DMA, and the solution is cooled to 0°–5° C. An addition is then made portionwise of 3.22 g (0.01 mole) of 3,3',4,4'-benzophenonetetracarboxylic acid dianhydride, and the reaction solution is stirred at 20°–25° C for a further 2 hours. The reaction solution is cooled to 10° C; 6.76 g (0.02 mole) of 3,5-bis-maleimidyl-phthalic acid anhydride is added portionwise and the solution is again stirred at 20°–25° C for 2 hours. There is then added 50 ml of acetic acid anhydride and the reaction mixture is stirred for a further 16 hours at 20°–25° C. The reaction mixture is subsequently poured into water; the precipitate is filtered off, washed with water and ethanol, and dried for 16 hours at 80° C in a vacuum furnace to obtain 11.4 g of crosslinkable oligoimide.

For processing by the compression process, the

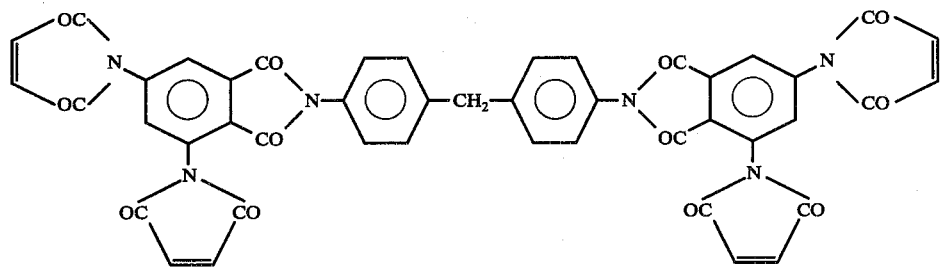

7.10 g (0.021 mole) of 3,5-bis-maleimidyl-phthalic acid anhydride is dissolved in 70 ml of anhydrous N,N-dimethylacetamide (DMA) in a nitrogen atomosphere in a sulphonating flask, and the solution is cooled to 0°–5° C. A solution of 1.98 g (0.01 mole) of 4,4'-diaminodiphenylmethane in 16 ml of DMA is added dropwise, with stirring, in such a manner that the temperature of the reaction mixture does not exceed 5° C. After 4 hours' stirring at 20°–25° C, there is added to the reaction solution 40 ml of acetic acid anhydride, and stirring is continued for 20 minutes at 20°–25° C. The reaction product is then precipitated in aqueous sodium acetate solution. The precipitate is washed firstly with water and afterwards with ethanol and is subsequently dried for 16 hours at 20°–25° C in a vacuum drying chamber. There is obtained 7.2 g (86% of theory) of crude product, which is boiled for 20 minutes in 100 ml of ethanol. On filtering and drying,, there is obtained 6.12 g (73% of theory) of the above tetra-imide in the form of a yellowish powder, m.p. 195°–225° C. The tetra-imide is soluble in acetone, dioxane, N,N-dimethylacetamide and N-methylpyrrolidone.

oligoimide obtained is introduced into a compression mould for circular discs, which is preheated to 240° C, and moulded at this temperature for 30 minutes under a pressure of 450 kp/cm². Transparent, slightly brittle moulded specimens are obtained.

EXAMPLE 4

5.95 g (0.03 mole) of 4,4'-diaminodiphenylmethane is dissolved in 120 ml of anhydrous DMA in a nitrogen atomosphere in a sulphonating flask, and the solution is cooled to −15 to −20° C. 4.21 g (0.02 mole) of trimellitic acid anhydride chloride is then added portionwise, with stirring, in such a manner that the temperature of the reaction mixture does not exceed −15° C. After stirring for 30 minutes at −15° C and for 1 hour at 20°–25° C, there is added dropwise a solution of 2.02 g (0.02 mol) of triethylamine in 20 ml of DMA. The reaction mixture is stirred for a further hour at 20°–25° C and the precipitated triethylamine hydrochloride is then removed by filtration and subsequently washed with 20 ml of DMA. There is added portionwise to the filtrate at 10° C 6.76 g (0.02 mole) of 3,5-bis-maleimidylphthalic acid anhydride and stirring is continued for 2 hours at 20°–25° C. An addition is then made of 50 ml of acetic acid anhydride and the reaction solution is again stirred at 20°–25° C for 16 hours. After precipitation in water, the precipitate is filtered off, washed with water and with ethanol, and dried for 16 hours at 80° C in a vacuum drying chamber to obtain 13.8 g of crosslinkable oligoamide-imide-tetraimide in the form of a yellowish powder.

For processing by the compression process, the above oligoamideimide is introduced into a compression mould, preheated to 240° C, for circular discs and moulded at this temperature for 30 minutes under a pressure of 450 kp/cm$^2$. Solid transparent discs having excellent electrical properties are obtained.

EXAMPLE 5

5.41 g (0.05 mole) of m-phenylenediamine is dissolved in 120 ml of anhydrous DMA in a nitrogen atmosphere in a sulphonating flask, and the solution is cooled to −15° to −20° C. Whilst stirring is maintained, 8.12 g (0.04 mole) of isophthalic acid dichloride is added portionwise in such a manner that the temperature of the reaction mixture does not exceed −15° C. After stirring for 30 minutes at this temperature and for one hour at 20°–25° C, there is added dropwise at −10° C a solution of 8.09 g (0.08 mole) of triethylamine in 50 ml of DMA. After 1 hour's stirring at 20°–25° C, the precipitated triethylamine hydrochloride is separated by filtration and the reaction mixture is subsequently washed with 25 ml of DMA. The filtrate is cooled to 0° C; an addition is made portionwise of 6.76 g (0.02 mole) of 3,5-bis-maleimidylphthalic acid anhydride, and stirring is maintained for 2 hours at 20°–25° C.

An aluminum sheet is coated with the solution obtained and is then dried as follows:

16 hours at 70° C/20 torr, 30 minutes at 100° C/20 torr, 30 minutes at 130° C/20 torr, 90 minutes at 150° C/20 torr, and 6 hours at 240° C/10$^{-1}$ torr.

A flexible, well adhesing coating is obtained.

A powder is produced by adding to the above solution 100 ml of acetic acid anhydride and stirring at 20°–25° C for 16 hours. After precipitation in water, the resulting precipitate is filtered, washed with water and with ethanol and dried in a vacuum drying chamber at 80° C for 32 hours. There is obtained 15.13 g of crosslinkable oligoamide in the form of a slightly yellowish powder.

This oligoamide powder is introduced into a compression mould, preheated to 245° C, for circular discs and moulded at this temperature for 1 hour under a pressure of 325 kp/cm$^2$. After annealing at 220° C for 16 hours, a solid transparent disc having good electrical properties is obtained.

EXAMPLE 6

4.32 g (0.04 mol) of m-phenylenediamine is dissolved in 110 ml of anhydrous DMA in a nitrogen atmosphere in a sulphonating flask, and the solution is cooled to −15° to −20° C. Whilst stirring is maintained, 8.37 g (0.035 mole) of sebacic acid dichloride is added dropwise in such a manner that the temperature of the reaction solution does not exceed −15° C. The reaction solution is stirred for one hour at 20°–25° C and a solution of 7.08 g (0.07 mol) of triethylamine in 25 ml of DMA is then added dropwise. After stirring for a further hour at 20°–25° C, the precipitated triethylamine hydrochloride is separated by filtration, and the reaction mixture is subsequently washed with 20 ml of DMA. The filtrate is cooled to 0° C; an addition is made of 3.38 g (0.01 mol) of 3,5-bis-maleimidyl-phthalic acid anhydride and the reaction solution is stirred at 20°–25° C for 2 hours. There is then added 70 ml of acetic acid anhydride and the reaction solution is stirred at 20°–25° C for 16 hours. After precipitation in water, the resulting precipitate is filtered off, washed with water and dried for 32 hours at 80° C in a vacuum chamber to obtain 11.6 g of crosslinkable oligoamide in the form of slightly yellowish powder.

For processing by the compression process, the oligoamide obtained is introduced into a compression mould preheated to 200° C and moulded at this temperature for 90 minutes under a pressure of 325 kp/cm$^2$. On annealing at 150° C for 16 hours, there are obtained transparent solid moulded discs.

For processing by hot compression moulding, the oligoamide is firstly submitted to a preliminary chain-lengthening reaction at 210° C for 20 minutes, and then moulded in a platen press for 30 minutes, with a raising of the temperature from 200° to 230° C, under a pressure of 50 kp/cm$^2$. Transparent solid moulded specimens are obtained.

EXAMPLE 7

Using the procedure described in Example 6, 2.16 g (0.02 mole) of m-phenylenediamine, 2.39 g (0.01 mole) of sebacic acid dichloride, 2.02 g (0.02 mole) of triethylamine and 6.76 g (0.02 mole) of 3,5-bis-maleimidyl-phthalic acid anhydride are reacted in 108 ml of DMA. On treatment of the reaction mixture with 70 ml of acetic acid anhydride, precipitation in water and drying in a vacuum chamber at 80° C, there is obtained 5.8 g of crosslinkable oligoamide in the form of slightly yellowish powder.

5.12 g (0.005 mol) of the above oligoamide is mixed with 0.40 g (0.002 mole) of 4,4'-diaminodiphenylmethane, and heated at 200° C for 7 minutes. After cooling, the solidified melt is ground to a fine powder. The prepolymer obtained is introduced into a compression mould, preheated to 170° C, for circular discs and moulded at this temperature for 1 hour under a pressure of 325 kp/cm$^2$. A transparent solid moulded specimen is obtained.

EXAMPLE 8

0.95 g (0.0048 mole) of 4,4'-diaminodiphenylmethane is dissolved in 11 ml of anhydrous DMA in a nitrogen atmosphere in a sulphonating flask, and the solution is cooled to 0°–5° C. An addition is made of 1.45 g (0.0045 mole) of 3,3+,4,4'-benzophenonetetracarboxylic acid dianhydride whilst stirring, and the reaction solution is then stirred at 20°–25° C for 1 hour. There is subsequently added at 0° C 0.20 g (0.0006 mole) of 3,3-bis-maleimidyl-phthalic acid anhydride.

After one hour's stirring at 20°–25° C, the reaction solution is spread over a glass plate to form a coating and this is dried as follows:

1 hour at 70° C/20 torr, 1 hour at 90° C/20 torr, 2 hours at 150° C/20 torr and 16 hours at 250° C/10$^{-1}$. A transparent flexible coating is obtained.

EXAMPLE 9

Using the procedure described in Example 5, 4.86 g (0.045 mole) of m-phenylenediamine, 6.09 g (0.03 mole) of isophthalic acid dichloride, 6.06 g (0.06 mole) of triethylamine and 10.14 g (0.03 mole) of 3,5-bis-maleimidyl-phthalic acid anhydride are reacted in 210 ml of anhydrous DMA. To the formed reaction mixture is then added a solution of 1.78 g (0.009 mole) of 4,4'-diaminodiphenylmethane in 10 ml of DMA, and the reaction mixture is stirred at 20°–25° C for 10 minutes. The precipitated treithylamine hydrochloride is the filtered off, and the reaction solution is poured onto aluminium plates. The coatings are dried and cured for 16 hours at 80° C/20 torr, 1 hour at 100° C/20 torr, 1 hour at 120° C/20 torr, 1 hour at 140° C/20 torr, 2 hours at 150° C/20 torr and for 16 hours at 200° C/10$^{-1}$ torr. Transparent flexible coatings are obtained.

We claim:

1. A crosslinkable compound of the formula I, as well as the corresponding cyclized derivative,

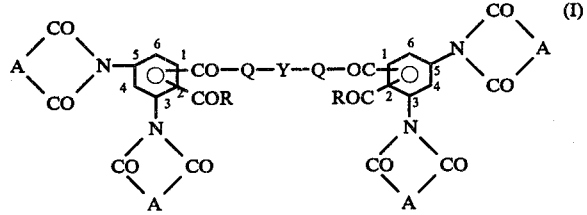

wherein
a carbonyl of the —COQYQOC— moiety and a —COR group are attached in pairs to adjacent carbon atoms at the 1- and 2-positions of the benzene rings, whereby on each benzene ring one of said carbonyl and —COR groups can be in the 1-position and the other in the 2-position,
the Rs independently of one another represent a hydroxyl group, phenoxy; phenoxy substituted by one or two nitro groups, by one alkyl of 1 to 2 carbon atoms, by one alkoxy of 1 to 2 carbon atoms or by two to five halogen atoms; alkoxy of 1 to 18 carbon atoms or an —O$^-$M$^+$ group, the A's independently of one another represent a radical of the formula

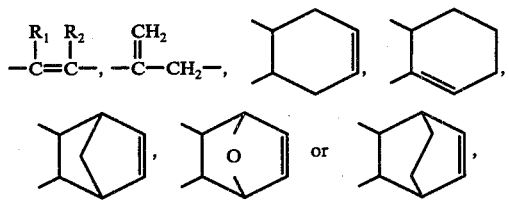

$R_1$ and $R_2$ independently of one another represent hydrogen, chlorine, bromine or methyl,
M$^+$ represents an alkali metal cation, a trialkylammonium cation having 3–24 carbon atoms, or a quaternary ammonium cation,
Q represents —NH—, and
Y represents an aliphatic radical having at least two carbon atoms, a cycloaliphatic, a carbocyclic - aromatic or a heterocyclic - aromatic radical, or

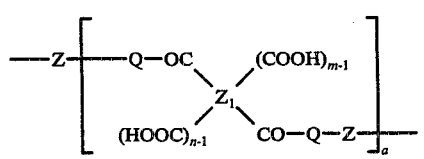

wherein
$a$ represents a number from 1–100, and the individual symbols $m$, $n$, Q, Z and $Z_1$ independently of one another have the following meanings:
$m$ and $n$ represent the number 1 or 2,
Q represents —NH— and
Z represents an aliphatic radical having at least two carbon atoms, a cycloaliphatic, carbocyclic-aromatic or heterocyclic-aromatic radical, or
Q and Z together with the adjacent Q in the formula I represent the grouping

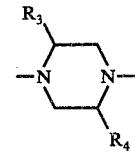

wherein
$R_3$ and $R_4$ independently of one another represent hydrogen, methyl or phenyl,
$Z_1$ represents an aliphatic radical having at least 2 carbon atoms, or a cycloaliphatic, carbocyclic-aromatic or heterocyclic-aromatic radical, in which the carbonamide groups and carboxyl groups are bound to different carbon atoms, and the carboxyl groups, if $Z_1$ represents a cyclic radical and at least one of $m$ and $n$ represents the number 2, are each in the ortho-position with respect to a carbonamide group, or —Q—Y—Q—represents the grouping

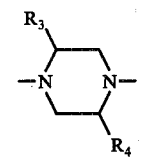

wherein $R_3$ and $R_4$ independently of one another represent hydrogen, methyl or phenyl.

2. A crosslinkable compound according to claim 1 of the formula I wherein A represents a radical —CH═CH—, R represents a hydroxyl group, Q represents —NH— and Y represents an unsubstituted alkylene group having 2–12 carbon atoms or a monocyclic or uncondensed bicyclic aromatic radical which is unsubstituted or substituted by halogen atoms, alkyl or alkoxy groups each having 1–4 carbon atoms, and in the case of the latter the aromatic nuclei are bound together direct or by way of the bridge member —O—, —CH$_2$— or —SO$_2$—, as well as the corresponding cyclized derivative.

3. A crosslinkable compound according to claim 1 of the formula I wherein Q represents —NH—, Y represents the 1,3- or 1,4-phenylene group, the 4,4'-diphenylmethane group, 4,4'-diphenylsulphone group or 4,4'-diphenyl ether group, A represents the radical —CH═CH—, and R represents a hydroxyl group, as well as the corresponding cyclized derivative.

4. A crosslinkable compound according to claim 1, wherein A represents a radical —CH═CH—, R represents a hydroxyl group, Q represents —NH—, Z represents an unsubstituted alkylene group having 2–10 carbon atoms, the 1,3- or 1,4-phenylene group, the 4,4'-diphenyl ether group, 4,4'-diphenylsulphone group or 4,4'-diphenylmethane group, and $Z_1$ represents an unsubstituted alkylene group having 2-10 carbon atoms, the 1,3- or 1,4-phenylene group, a benzenetriyl or benzenetetrayl group or the benzophenone ring system, as well as the corresponding cyclized derivative.

5. A crosslinkable compound according to claim 1, wherein A represents a radical —CH=CH—, R represents a hydroxyl group, a represents an integer from 1-10, Q represents —NH—, where $m$ and $n = 1$, Z represents the 1,3- or 1,4-phenylene group, the 4,4'-diphenylmethane group or 4,4'-diphenyl ether group, and $Z_1$ represents the 1,3- or 1,4-phenylene group, whereby only one of Z and $Z_1$ represents the 1,4-phenylene group, or, where $m$ and $n = 2$, Z represents the 4,4'-diphenylmethane group or 4,4'-diphenyl ether group and $Z_1$ represents a benzenetetrayl group or the benzophenone ring system, and, where $m = 1$ and $n = 2$, Z represents the 4,4'-diphenylmethane group or 4,4'-diphenyl ether group and $Z_1$ represents a benzenetriyl group, as well as the corresponding cyclized derivative.

6. A crosslinked polymer obtained by heating a compound of formula I according to claim 1, or the corresponding cyclized derivative, at a temperature of about 50° to 250° C in the presence of a radical initiator selected from the group consisting of inorganic peroxides, organic peroxides and azo compounds.

7. A crosslinked polymer obtained by heating a compound of formula I according to claim 1, or the corresponding cyclized derivative, at a temperature of about 150° to 350° C.

8. A crosslinked polymer obtained by subjecting a compound of formula I according to claim 1, or the corresponding cyclized derivative, to irradiation by electromagnetic waves selected from the group consisting of X-rays and UV light.

9. A crosslinked polymer according to claim 8 wherein the compound of formula I, or in the corresponding cyclized derivative, A is

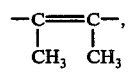

and the electromagnetic irradiation is carried out in the presence of a sensitizer selected from the group consisting of benzene, 1,4-diacetylbenzene, phenol, benzonitrile, acetophenone, benzophenone, benzaldehyde, diisopropyl ketone and fluorene.

10. A crosslinked polymer according to claim 6 wherein the compound of formula I, or the corresponding cyclized derivative, is heated in the presence of a compound selected from the group consisting of diamines of the formula $$NH_2—Z—NH_2$$

where Z represents alkylene of 2 to 10 carbon atoms, 1,3-phenylene, 1,4-phenylene,

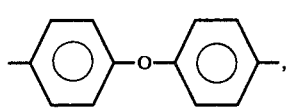

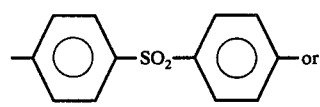

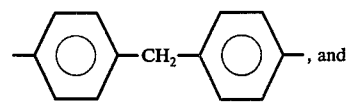

vinyl compounds of the formula

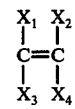

wherein $X_1$ and $X_3$ each represent hydrogen, $X_2$ represents hydrogen, chlorine or methyl, and $X_4$ represents hydrogen, methyl, ethyl, chlorine, —CN, —COOH, —CONH$_2$, phenyl, methylphenyl, methoxyphenyl, cyclohexyl, pyridyl, imidazolyl, pyrrolidonyl, —COO—alkyl having 1-12 carbon atoms in the alkyl moiety, —COO—phenyl,

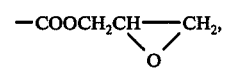

—COO-alkyl-OH having 1-3 carbon atoms in the alkyl moiety, —OCO-alkyl having 1—4 carbon atoms in the alkyl moiety, —OCO-phenyl, —CO-alkyl having 1-3 carbon atoms in the alkyl moiety, alkoxy having 1-6 carbon atoms, phenoxy, —CH=CH$_2$ or

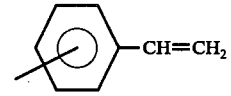

$X_1$ and $X_2$ each represent hydrogen, and $X_3$ and $X_4$ together form the grouping

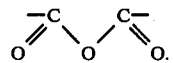

11. A crosslinked polymer according to claim 7 wherein the compound of formula I, or the corresponding cyclized derivative, is heated in the presence of a compound selected from the group consisting of diamines of the formula

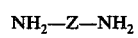

where Z represents alkylene of 2 to 10 carbon atoms, 1,3-phenylene, 1,4-phenylene,

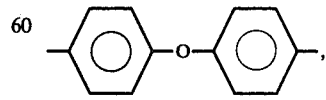

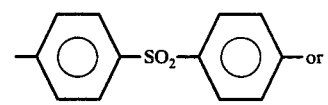

-continued

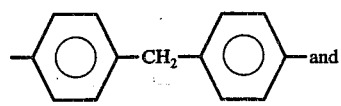 and

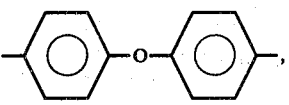, vinyl compounds of the formula

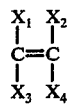

wherein
  X₁ and X₃ each represent hydrogen, X₂ represents hydrogen, chlorine or methyl, and X₄ represents hydrogen, methyl, ethyl, chlorine, —CH, —COOH, —CONH₂, phenyl, methylphenyl, methoxyphenyl, cyclohexyl, pyridyl, imidazolyl, pyrrolidonyl, —COO-alkyl having 1–12 carbon atoms in the alkyl moiety, —COO-phenyl,

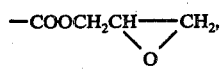

—COO-alkyl-OH having 1–3 carbon atoms in the alkyl moiety, —OCO-alkyl having 1–4 carbon atoms in the alkyl moiety, —OCO-phenyl, —CO-alkyl having 1–3 carbon atoms in the alkyl moiety, alkoxy having 1–6 carbon atoms, phenoxy, —CH=CH₂ or

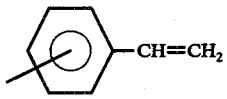

or
  X₁ and X₂ each represent hydrogen, and X₃ and X₄ together from the grouping

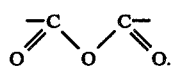

12. A crosslinked polymer according to claim 8 wherein the compound of formula I, or the corresponding cyclized derivative, is irradiated in the presence of a compound selected from the group consisting of diamines of the formula

NH₂—Z—NH₂ where Z represents alkylene of 2 to 10 carbon atoms, 1,3-phenylene, 1,4-phenylene,

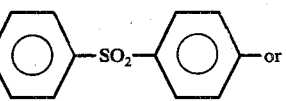

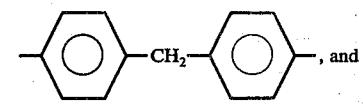

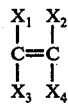, and vinyl compounds of the formula

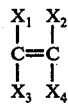

wherein
  X₁ and X₃ each represent hydrogen, X₂ represents hydrogen, chlorine or methyl, and X₄ represents hydrogen, methyl, ethyl, chlorine, —CN, —COOH, —CONH₂, phenyl, methylphenyl, methoxyphenyl, cyclohexyl, pyridyl, imidazolyl, pyrrolidonyl, —COO-alkyl having 1–12 carbon atoms in the alkyl moiety, —COO-phenyl,

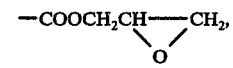

—COO-alkyl having 1–3 carbon atoms in the alkyl moiety, —OCO-alkyl having 1–4 carbon atoms in the alkyl moiety,—OCO-phenyl, —CO-alkyl having 1–3 carbon atoms in the alkyl moiety, alkoxy having 1–6 carbon atoms, phenoxy, —CH=CH₂ or

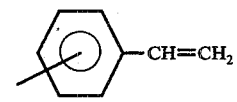

X₁ and X₂ each represent hydrogen, and X₃ and X₄ together form the grouping

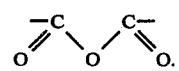

* * * * *